(12) United States Patent
Babazadeh et al.

(10) Patent No.: US 9,240,721 B2
(45) Date of Patent: Jan. 19, 2016

(54) MULTIPHASE DIGITAL CURRENT MODE CONTROLLER WITH DYNAMIC CURRENT ALLOCATION

(75) Inventors: Amir Babazadeh, Irvine, CA (US); Benjamim Tang, Rancho Palos Verdes, CA (US); Giuseppe Bernacchia, Redondo Beach, CA (US); Kenneth Ostrom, Palos Verdes Estates, CA (US)

(73) Assignee: Infineon Technologies Austria AG, Villach (AT)

( * ) Notice: Subject to any disclaimer, the term of this patent is extended or adjusted under 35 U.S.C. 154(b) by 579 days.

(21) Appl. No.: 13/547,282

(22) Filed: Jul. 12, 2012

(65) Prior Publication Data

US 2014/0015500 A1    Jan. 16, 2014

(51) Int. Cl.
*H02M 3/158* (2006.01)
*H02M 1/00* (2007.01)
*H02M 3/156* (2006.01)

(52) U.S. Cl.
CPC .... *H02M 3/1584* (2013.01); *H02M 2001/0032* (2013.01); *H02M 2003/1566* (2013.01); *Y02B 70/16* (2013.01)

(58) Field of Classification Search
CPC .................. H02M 3/1584; H02M 2001/0032; H02M 2003/1566
USPC ........ 323/271, 272, 283, 285; 363/65, 78, 79, 363/80
See application file for complete search history.

(56) References Cited

U.S. PATENT DOCUMENTS

| | | | |
|---|---|---|---|
| 6,943,535 B1 * | 9/2005 | Schiff ........................... | 323/246 |
| 6,995,548 B2 | 2/2006 | Walters et al. | |
| 7,109,689 B2 | 9/2006 | Schneider | |
| 7,259,473 B2 | 8/2007 | Petricek | |
| 7,902,803 B2 | 3/2011 | Peng et al. | |
| 2004/0052098 A1 | 3/2004 | Burstein et al. | |

(Continued)

FOREIGN PATENT DOCUMENTS

| | | |
|---|---|---|
| CN | 101273318 A | 9/2008 |
| DE | 2754846 A1 | 6/1979 |
| DE | 4124616 A1 | 1/1993 |
| DE | 10216252 A1 | 11/2003 |

OTHER PUBLICATIONS

Jajm Geerligs, G Van Rhee. "Discrete LQ-Control of a Buck Converter." ENE. Brighton, 1993. pp. 287-291.

(Continued)

*Primary Examiner* — Jue Zhang
*Assistant Examiner* — Lakaisha Jackson
(74) *Attorney, Agent, or Firm* — Murphy, Bilak & Homiller, PLLC (57) ABSTRACT

A multiphase switching regulator includes a power stage with at least a first phase and a second phase for supplying power to a load through inductors coupling the phases to the load. The multiphase switching regulator is operated by switching the first phase at a higher switching frequency than the second phase via pulse width modulation (PWM) signals provided to the phases. A phase-specific target current is generated for each phase at the switching frequency for that phase based on the difference between an output voltage of the power stage and a reference voltage. The current in the inductors coupling the phases to the load is sensed, and a duty cycle of the PWM signal provided to each phase is adjusted based on the phase-specific target current and sensed inductor current for that phase.

31 Claims, 5 Drawing Sheets

(56) References Cited

U.S. PATENT DOCUMENTS

2007/0236287 A1* 10/2007 Bernacchia et al. ............ 330/10
2008/0303495 A1    12/2008 Wei et al.
2009/0079401 A1*  3/2009 Mok et al. .................... 323/234

OTHER PUBLICATIONS

PR Holme and CD Manning. "Digital Control of High Frequency PWM Converters." Loughborough University of Technology. ENE. Brighton, 1993. pp. 260-265.

* cited by examiner

Figure 5

MULTIPHASE DIGITAL CURRENT MODE CONTROLLER WITH DYNAMIC CURRENT ALLOCATION

FIELD OF TECHNOLOGY

The present application relates to multiphase switching regulators, in particular dynamic current allocation for multiphase switching regulators.

BACKGROUND

Switching power supplies are widely used for high power applications because of their high efficiency and small size. Multiphase buck converters are particularly well suited for providing high current at low voltages required by state of the art high performance integrated circuits such as microprocessors, graphics processors, and network processors. Buck converters are typically implemented with active components such as a pulse width modulation controller (PWM), driver, power MOSFETs (metal oxide semiconductor field effect transistors), and passive components such as inductors, transformers or coupled inductors, capacitors, and resistors.

Multiphase buck converters are typically designed so that the elements of each phase (channel) are similar or identical and operated in an interleaved manner to minimize output ripple and provide fastest dynamic response. Buck converters typically operate over a large range of output current, for example from zero to maximum load, and therefore conventional buck converters are not necessarily optimized at any given range. Instead, the designer is restricted in the selection of components and switching frequency to optimize diverse performance parameters such as light load efficiency and fast response to a maximum load step.

For example, multiphase buck converters for microprocessors or other high performance integrated circuits require large amounts of supply current and are subject to very fast transients. Conventional multiphase buck converters typically include many phases (channels) connected in parallel and phase interleaved to equally share and provide high output current so that the regulator can respond quickly to fast dynamic voltage transitions and fast transient load conditions. 'Fast dynamic voltage transitions' and 'fast transient load conditions' are referred to collectively herein as 'fast dynamic conditions'. To cope with fast transients, a relatively high switching rate is required. However, high switching frequency yields an inefficient system. The usual solution for obtaining the desired efficiency is to reduce the switching frequency, increase the output capacitor and use several channels in parallel which leads to an increased system cost.

SUMMARY

According to the embodiments described herein, a multiphase control scheme for multiphase switching regulators is provided that allows asymmetric or dissimilar phases to operate independently thereby allowing optimization of diverse performance parameters. This leads to higher transient performance, lower cost and more efficient operation of multiphase switching regulators.

According to an embodiment of a method of operating a multiphase switching regulator having a power stage with at least a first phase and a second phase for supplying power to a load through inductors coupling the phases to the load, the method comprises: switching the first phase at a higher switching frequency than the second phase via pulse width modulation (PWM) signals provided to the phases; generating a phase-specific target current for each phase at the switching frequency for that phase based on the difference between an output voltage of the power stage and a reference voltage; sensing the current in the inductors coupling the phases to the load; and adjusting a duty cycle of the PWM signal provided to each phase based on the phase-specific target current and sensed inductor current for that phase.

According to an embodiment of a multiphase switching regulator, the multiphase switching regulator comprises a power stage including at least a first phase and a second phase for supplying power to a load through inductors coupling the phases to the load, and current sensors operable to sense the current in the inductors coupling the phases to the load. The multiphase switching regulator further comprises a controller operable to switch the first phase at a higher switching frequency than the second phase via pulse width modulation (PWM) signals provided to the phases, generate a phase-specific target current for each phase at the switching frequency for that phase based on the difference between an output voltage of the power stage and a reference voltage, and adjust a duty cycle of the PWM signal provided to each phase based on the phase-specific target current and sensed inductor current for that phase.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide dynamic current allocation for multiphase switching regulators by allowing asymmetric or dissimilar phases to operate independently. The dynamic current allocation techniques described herein can be applied to any switching regulator architecture, including: buck; boost; buck-boost; flyback; push-pull; half-bridge; full-bridge; and SEPIC (single-ended primary-inductor converter). A buck converter generates an output DC voltage that is lower than the input DC voltage. A boost converter generates an output voltage that is higher than the input. A buck-boost converter generates an output voltage opposite in polarity to the input. A flyback converter generates an output voltage that is less than or greater than the input, as well as multiple outputs. A push-pull converter is a two-transistor converter especially efficient at low input voltages. A half-bridge converter is a two-transistor converter used in many off-line applications. A full-bridge converter is a four-transistor converter usually used in off-line designs that can generate very high output power. A SEPIC is a type of DC-DC converter allowing the electrical voltage at its output to be greater than, less than, or equal to that at its input.

Figure 1:
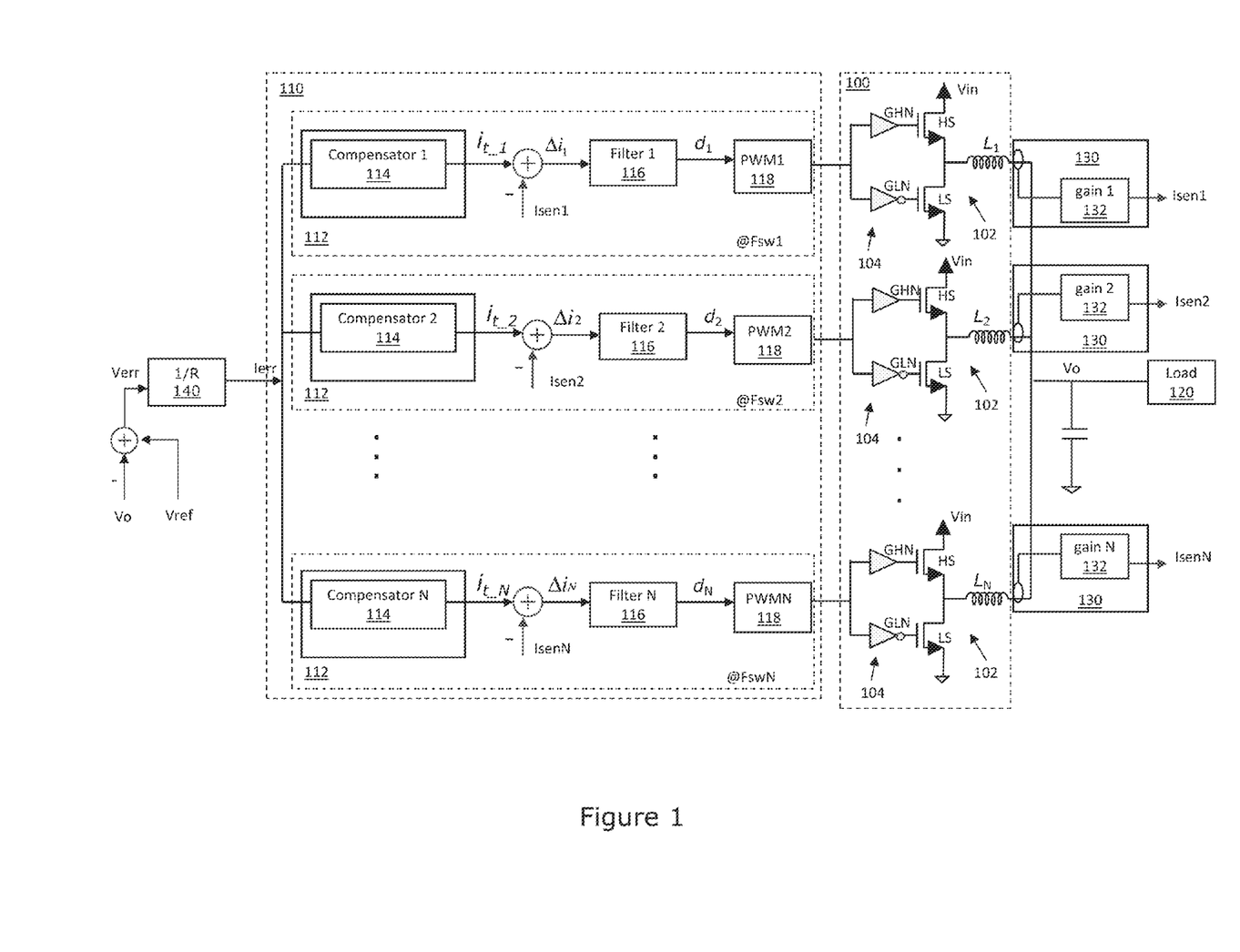
FIG. 1 illustrates a block diagram of a switching regulator according to a first embodiment.

FIG. 1 illustrates an embodiment of a multiphase switching regulator that includes a power stage 100 and a controller 110 for controlling operation of the power stage 100. The power stage 100 has at least two phases 102 operated at different switching frequencies (Fswm). In FIG. 1, N phases 102 are shown. Each phase 102 can have a different switching frequency. Alternatively, the phases 102 may be divided into two or more groups where each group has the same switching frequency. For example, one group may include slow phases 102 operated at a slower switching frequency and another group may include fast phases 102 operated at a higher switching frequency. The group of slow phases 102 can be used to supply thermal design current (TDC) and static current, and the group of fast phases 102 can be used for turbo (fast peak power) and transient response to dynamic currents exceeding the TDC and static operating currents. In this approach the slow phases 102 provide current for steady state operation, and the fast phases 102 provide current for fast dynamic conditions at the output such as voltage transitions, load transients, and fast peak power operation. This architecture advantageously uses both slow phases 102 for higher efficiency operation and fast phases 102 for faster transient response. The slow and fast phases 102 can both be switched to respond to a fast dynamic condition at the output.

The phases 102 each include a high-side transistor (HS) and a low-side transistor (LS) for supplying power to a load 120 through inductors (Lm) which couple the phases 102 to the load 120. The high-side transistor of each phase 102 switchably connects the load 120 to an input voltage (Vin) and the corresponding low-side transistor switchably connects the load 120 to ground at different periods as determined by the controller 110.

The controller 110 includes a control unit 112 associated with each phase 102 of the power stage 100. Each control unit 112 includes a compensator 114, filter 116 and pulse width modulation (PWM) controller 118 for controlling the switching i.e. turn on and turn off of the corresponding power stage phase 102 to provide output voltage regulation to a desired set-point (Vref). The switching frequency (Fswm) of each phase 102 can be set independently from the other phases 102 to improve overall output regulation under different operating conditions such as high/low load current, Vref set-point change, load changes, etc.

Current sensors 130 are provided for sensing the current in the inductors coupling the phases 102 to the load 120. The current sensors 130 can include a gain unit 132 for amplifying the sensed phase inductor current (Isenm). The sensed phase inductor currents are fed back to the corresponding control units 112. Also input to the control units 112 is a current representation of the common error voltage (Verr). The common voltage error corresponds to the difference between the output voltage (Vo) of the power stage 100 and the reference voltage (Verr), and can be generated as Verr=Vref−Vo. The common error voltage is converted to a corresponding common error current (Ierr) which is input to the compensators 114 of the control units 112. The common error voltage can be converted to a corresponding common error current by a converter 140 using any suitable known technique e.g. such as inductor DCR (direct current resistance).

Each compensator 114 generates a phase-specific target current ($i_{t\_m}$) for the corresponding phase 102 at the switching frequency (Fswm) for that phase 102 based on the common error current (Ierr), where Ierr corresponds to the difference between the power stage output voltage and the reference voltage as explained above. The compensators 114 can be individually optimized to obtain the widest bandwidth according to the switching frequency chosen for each phase 102. Each control unit 112 adjusts the duty cycle (dm) of the PWM signal provided by the PWM controller 118 to the corresponding phase 102 based on the phase-specific target current $i_{t\_m}$ and sensed inductor current (Isenm) for that phase 102. Drivers 104 provide gate drive signals (GHN, GLN) to the gates of the high-side and low-side transistors of the corresponding phase 102, in response to the PWM signals generated by the PWM controllers 118.

In one embodiment, the control units 112 generate a current error signal $\Delta i_m$ based on the difference between the phase-specific target current $i_{t\_m}$ and sensed inductor current Isenm for the respective phases 102. The target current can be average or peak current. The target current and the sense current may be a current representing the phase current, such as the peak current or average current for the next PWM cycle, or some other appropriate representation of the phase current. Each PWM controller 118 adjusts the duty cycle (dm) of the PWM signal provided to the corresponding phase 102 based on the current error signal $\Delta i_m$ for that phase 102. The control units 112 can further include a filter 116 for removing high frequency components of the current error signals. The filters 116 compensate for any deviation of the phase current from the target current, making the system independent from application parameters such as inductor value and parasitic resistances in the phase current path. The phases 102 of the switching regulator switch based on the switching frequency (Fswm) set for that phase 102, with a duty cycle (dm) determined so that the regulator provides dynamic current allocation to the load 120.

Figure 2:
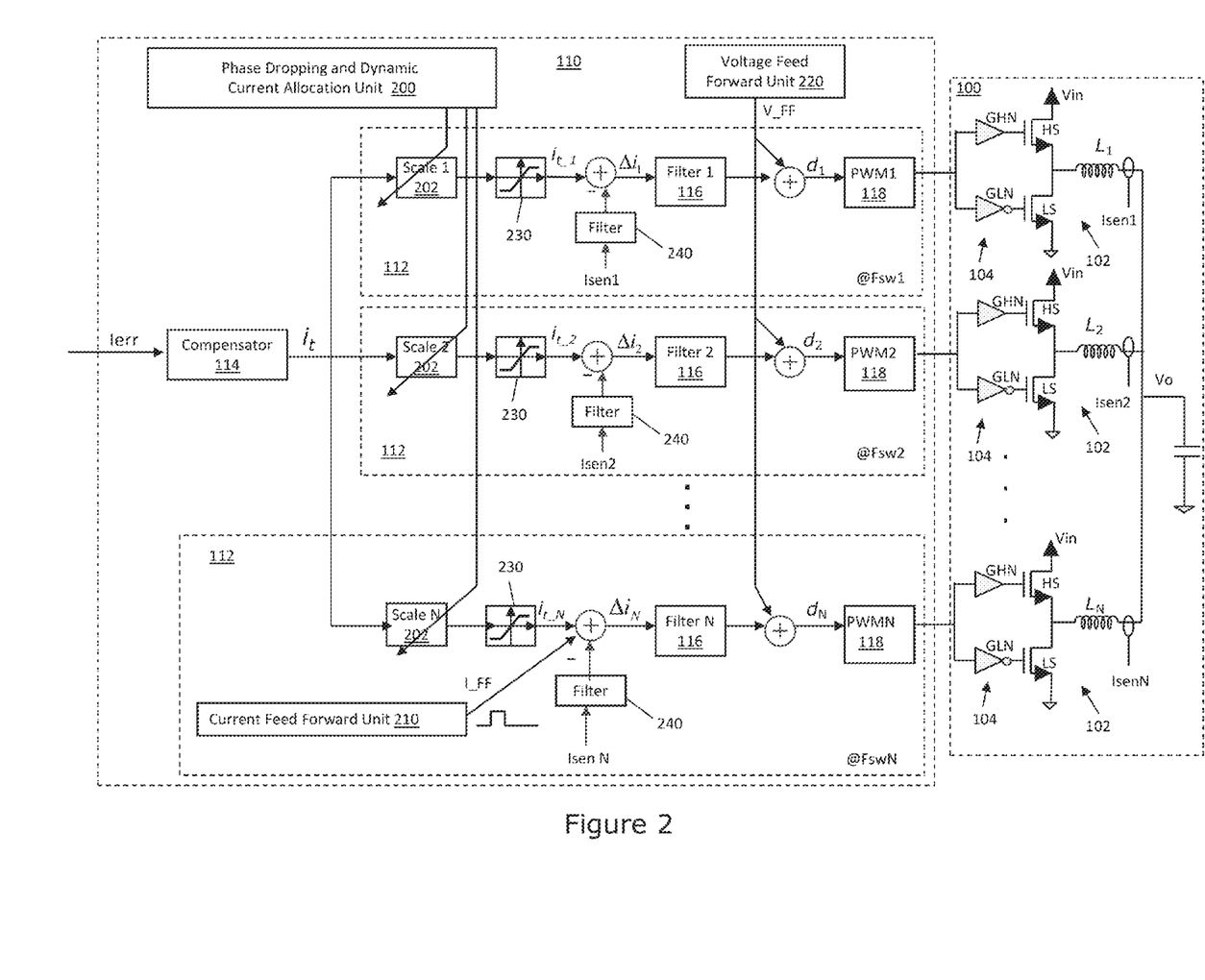
FIG. 2 illustrates a block diagram of a switching regulator according to a second embodiment.

FIG. 2 illustrates another embodiment of a multiphase switching regulator that includes a power stage 100 and a controller 110 for controlling operation of the power stage 100. The details of the current sensors are not shown in FIG. 2 for ease of illustration, and can be implemented as shown in FIG. 1 or using any other suitable known current sensing scheme. The load is also not shown in FIG. 2 for ease of illustration. According to the embodiment illustrated in FIG. 2, a single compensator 114 is used to generate a common target current ($i_t$) for all of the phases 102 based on the common error current signal (Ierr). Each control unit 112 adjusts the duty cycle (dm) of the PWM signal provided by the PWM controller 118 to the corresponding phase 102 based on the common target current $i_t$ and the sensed inductor current (Isenm) for that phase 102.

Further according to the embodiment illustrated in FIG. 2, the controller 110 also includes a phase dropping and dynamic current allocation unit 200. The phase dropping and dynamic current allocation unit 200 dynamically adjusts the amount of current carried by one or more of the phases 102 in order to optimize the transient performance and efficiency of the regulator at a particular operating point. For example, the unit 200 can deactivate one or more of the phases 102 and redistribute the current to each remaining active phase 102 responsive to a decrease in the load current. The unit 200 likewise can activate one or more previously deactivated ones of the phases 102 and redistribute the current to each active phase 102 responsive to an increase in the load current.

The phase dropping and dynamic current allocation unit 200 can allocate the load current equally between the phases 102. Conversely, the unit 200 can allocate the load current unequally between the phases 102. For example, load current allocation can be programmed based on the size and characteristics of each particular phase 102. In one embodiment, the phase dropping and dynamic current allocation unit 200 sets a scaling factor 202 for each phase 102 which determines the load current allocation between the phases 102. The phase current scaling factors 202 determine the percentage of load current allocated to each phase 102. For example in a 3-phase system each scaling factor 202 can be set to ⅓ so that the contribution of each phase 102 is 33% of the total load current. The scaling factors 202 instead can be set unequally so that the common target current ($i_t$) is scaled differently for at least one of the phases 102 which contributes more or less load current than other ones of the phases 102.

The controller 110 also includes a current feed forward unit 210 for increasing the current provided by the fast phase(s) 102 to the load responsive to a dynamic voltage transition before the common target current $i_t$ reflects the transient load event. The current feed forward unit 210 reduces the overall latency of the regulator and forces the fast phases 102 to react to dynamic voltage transitions as fast as possible. In FIG. 2, the Nth phase 102 is illustrated as a fast phase. However, any number of the phases 102 may be fast phases as previously described herein.

In one embodiment, the current feed forward unit 210 generates a pulse signal with a programmable width as shown in FIG. 2, which is combined with the common target current $i_t$ and the sensed inductor current Isenm for each fast phase 102. In another embodiment, the current feed forward unit 210 combines a scaled derivative of the output voltage (e.g. CdVo/dt) with the common target current and the sensed inductor current for each fast phase 102. In each case, the signal ($I_{13}$ FF) generated by the current feed forward unit 210 begins to affect a change in the duty cycle (dm) for the fast phase(s) 102 before the common target current reflects the dynamic voltage transitioning event.

The controller 110 further includes a voltage feed forward unit 220 added between the filters 116 and the PWM controllers 118 of the control units 112. The voltage feed forward unit 220 generates feed forward information (V_FF) which is combined with the filter outputs, and reflects the ratio of the power stage output voltage to input voltage (Vo/Vin) and the voltage drop caused by an adaptive voltage positioning (AVP) loop implemented by the controller 110. The controller 110 can implement any conventional AVP loop, and therefore no further description of the AVP loop is provided herein. The controller 110 can also include saturation blocks 230 which limit the maximum current of each phase 102, and additional filters 240 on the current loops which remove high frequency components of the sensed inductor currents Isenm and enable the slow phases 102 to operate smoothly.

Figure 3:
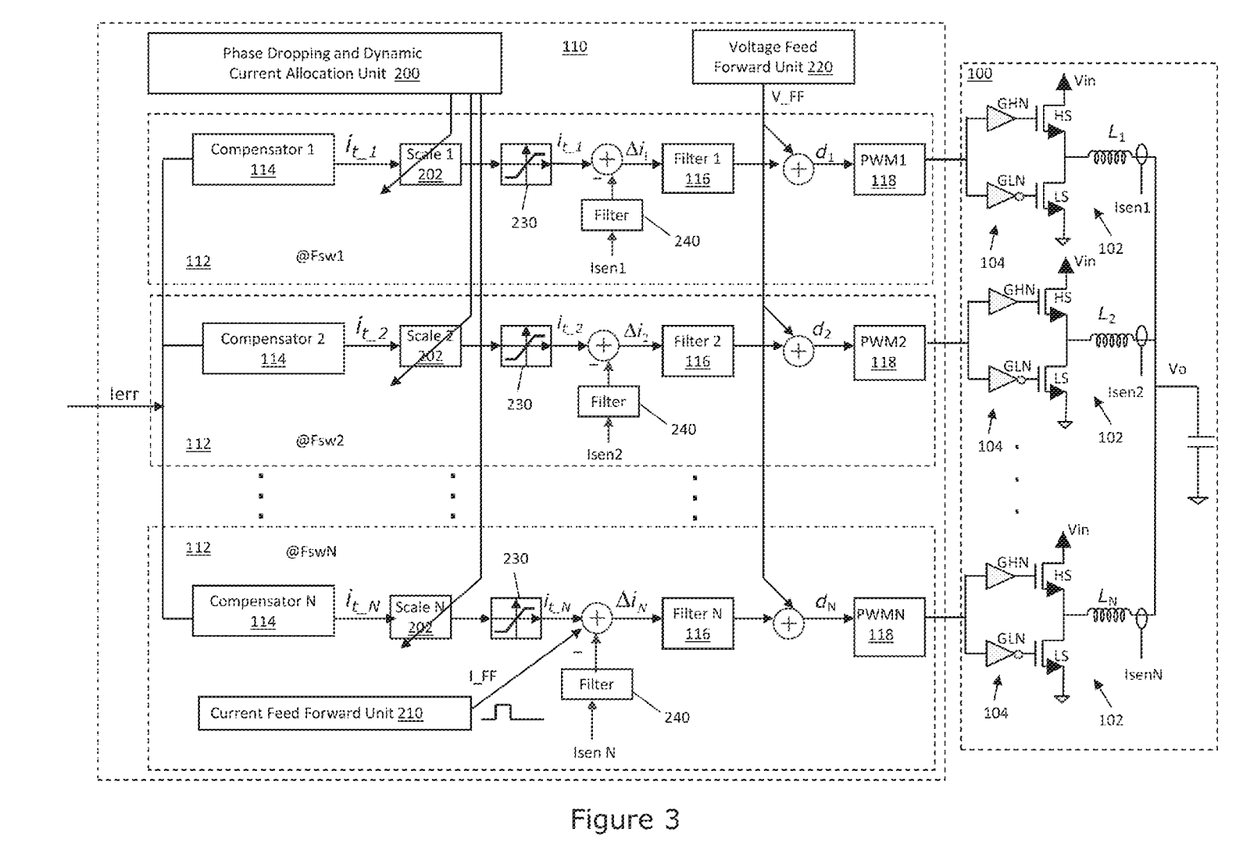
FIG. 3 illustrates a block diagram of a switching regulator according to a third embodiment.

FIG. 3 illustrates an embodiment of a multiphase switching regulator which is similar to the embodiment illustrated in FIG. 2, however each phase control unit 112 includes a compensator 114 for generating a phase-specific target current ($i_{t\_m}$) for the corresponding phase 102 at the switching frequency (Fswm) for that phase 102 based on the common error current (Ierr) as previously described herein with regard to FIG. 1 instead of generating a common target current. Further according to the embodiment illustrated in FIG. 3, the current feed forward unit 210 can generate a pulse signal with a programmable width which is combined with the phase-specific target current $i_{t\_m}$ and sensed inductor current Isenm for each fast phase 102, or alternatively combine a scaled derivative of the output voltage (e.g. CdVo/dt) with the phase-specific target current and sensed inductor current for each fast phase 102. In each case, the signal (I_FF) generated by the current feed forward unit 210 begins to affect a change in the duty cycle (dm) for the fast phase(s) 102 before the phase-specific target current ($i_{t\_m}$) for the fast phase(s) 102 reflects the dynamic voltage transitioning event.

Figure 4:
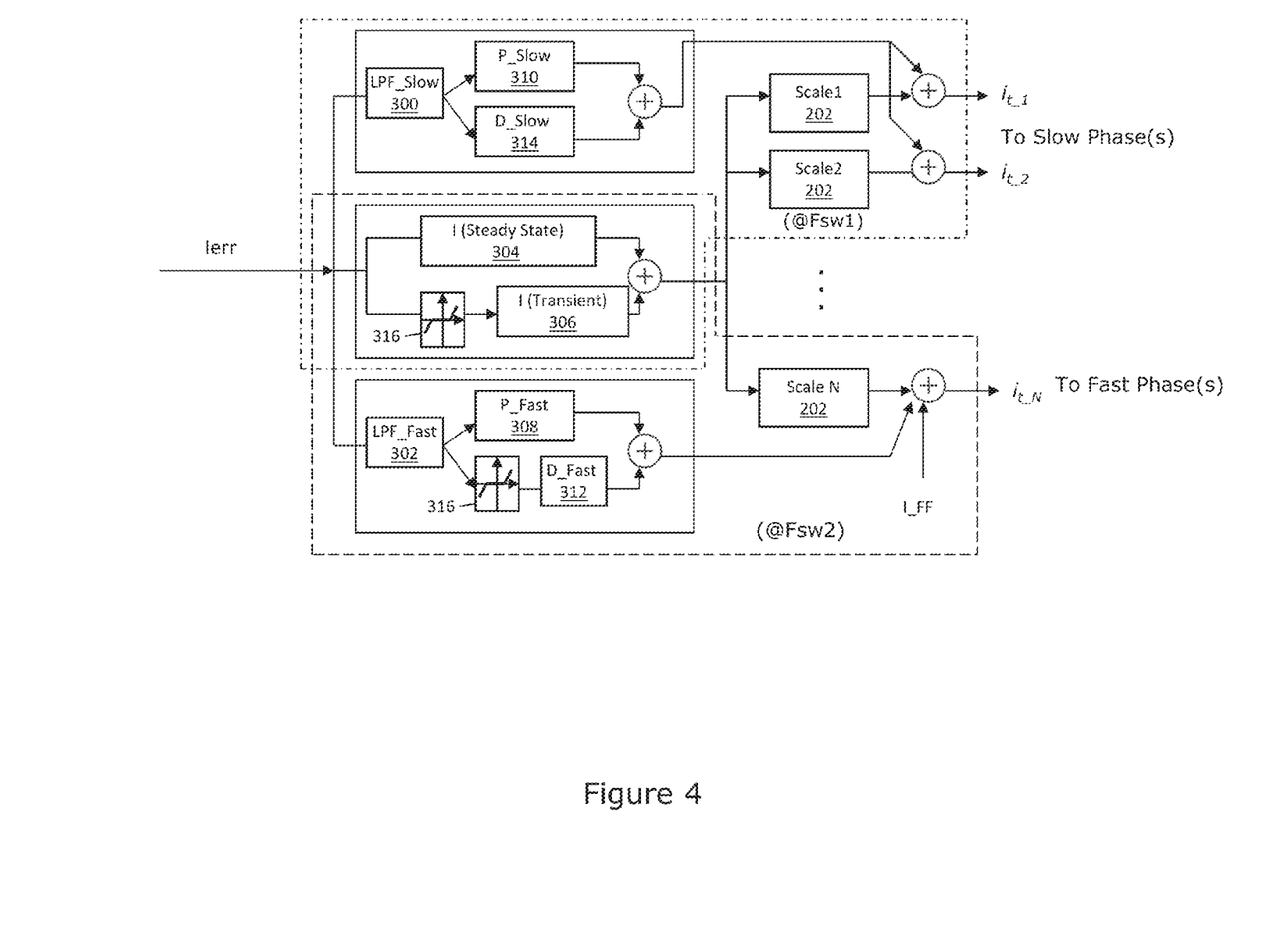
FIG. 4 illustrates a block diagram of an embodiment of a nonlinear PID compensator for use with the switching regulator of FIG. 3.

FIG. 4 illustrates an embodiment of the compensators 114 of the multiphase switching regulator controller 110 shown in FIG. 3. According to this embodiment, the compensators 114 are implemented using a nonlinear proportional-integral-derivative (PID) controller for use with a switching regulator having one or more slow phases 102 operating at a first switching frequency Fsw1 and one or more fast phases 102 operating at a second switching frequency Fsw2>Fsw1. The nonlinear PID controller includes a low pass filter (LPF) 300, 302 for the slow and fast phases 102, for removing high frequency components from the common error current signal (Ierr) over each switching frequency of interest (Fsw1 and Fsw2 in this example).

The nonlinear PID controller also has a first integral unit 304 common to all phases 102 which is active for steady state load conditions, and a second integral unit 306 common to all phases 102 which is active for fast dynamic conditions at the output. The nonlinear PID controller further has a first proportional unit 308 associated with the fast phase(s) 102 and a second proportional unit 310 associated with the slow phase(s) 102. The nonlinear PID controller further has a first derivative unit 312 associated with the fast phase(s) 102 and a second derivative unit 314 associated with the slow phase(s) 102. The proportional (P) and derivative (D) terms can be different for the fast and slow phases 102. A current feed forward term (I_FF) can be applied to the fast phase(s) 102 to force a response to the fast dynamic condition as previously described herein.

The nonlinear PID controller generates the phase-specific target current $i_{t\_m}$, for each phase 102 based on the difference between the power stage output voltage (Vo) and the reference voltage (Vref). This difference is input as a common error current signal (Ierr) to the LPFs 300, 302, integral units 304, 306, proportional units 308, 310 and derivative units 312, 314. Dead zone filters 316 can be provided for the fast phase paths to ensure the common error current (Ierr) is non-zero when input to the second (transient) integral unit 306 and the first (fast) derivative unit 312 only during fast dynamic conditions at the output e.g. only when a sudden change of the output voltage (Vo) occurs. The dead zone filters 316 reduce sensitivity and jitter during steady state operations.

Figure 5:
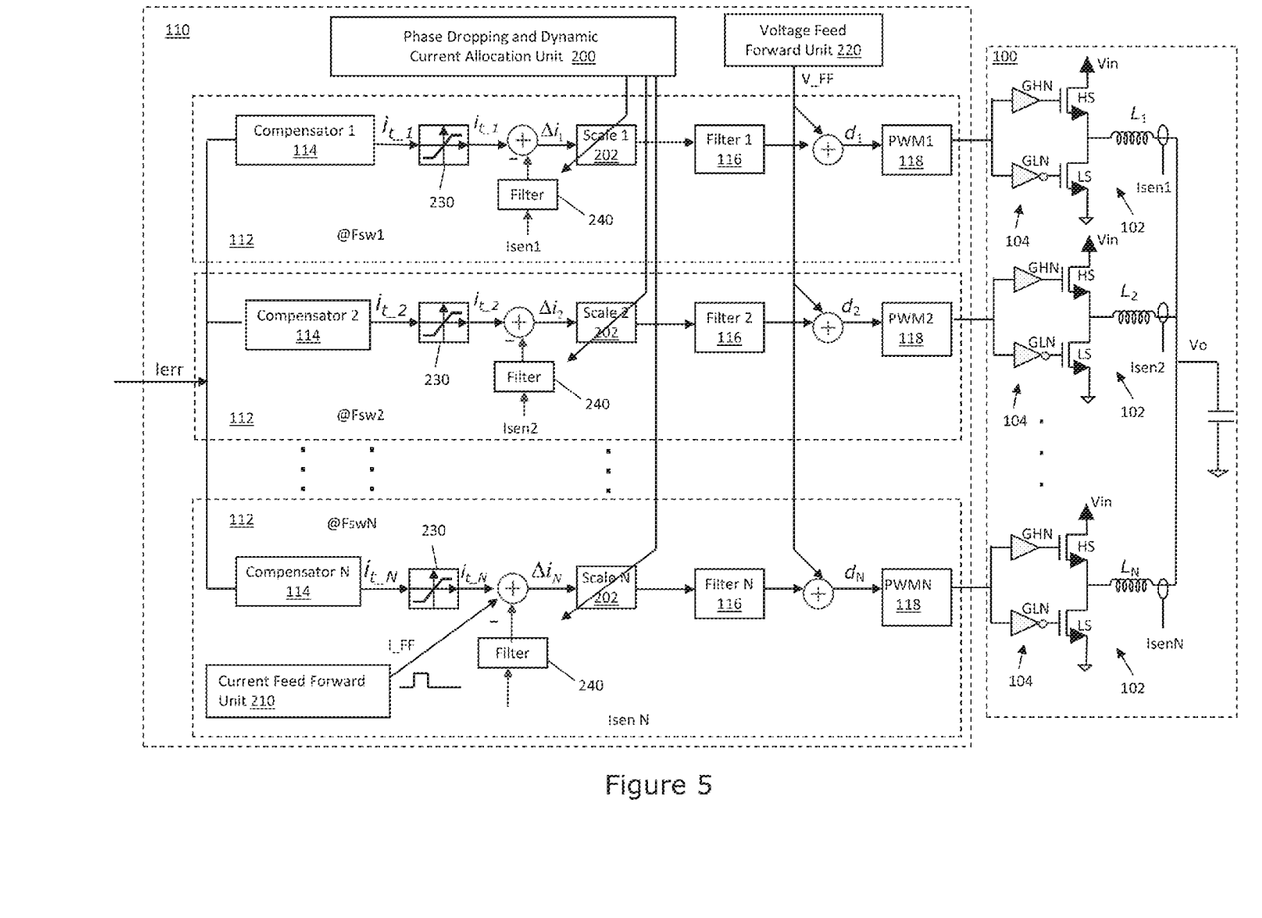
FIG. 5 illustrates a block diagram of a switching regulator according to a fourth embodiment.

FIG. 5 illustrates an embodiment of a multiphase switching regulator which is similar to the embodiment illustrated in FIG. 3, however the scalars 202 operate further downstream in the phase current feedback loops on the corresponding phase current error signal $\Delta i_m$ instead of the phase-specific target current ($I_{t\_m}$).

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of operating a multiphase switching regulator having a power stage with at least a first phase and a second phase for supplying power to a load through inductors coupling the phases to the load, the method comprising:
   switching the first phase at a higher switching frequency than the second phase via pulse width modulation (PWM) signals provided to the phases;
   generating a phase-specific target current for each phase at the switching frequency for that phase based on the difference between an output voltage of the power stage and a reference voltage;
   sensing the current in the inductors coupling the phases to the load;
   generating a current error signal for each phase based on the difference between the phase-specific target current and sensed inductor current for that phase;
   filtering each of the current error signals; and
   adjusting a duty cycle of the PWM signal provided to each phase based on the filtered current error signal for that phase.

2. The method according to claim 1, further comprising limiting a maximum current supplied to the load.

3. The method according to claim 1, wherein filtering each of the current error signals comprises removing high frequency components of the current error signals.

4. The method according to claim 1, further comprising scaling the current error signals prior to the filtering.

5. The method according to claim 1, wherein the phase-specific target current is the peak current for a next cycle of the PWM signal or the average current for the next cycle.

6. The method according to claim 1, further comprising switching both the first and second phases to respond to a fast dynamic condition.

7. The method according to claim 1, further comprising dynamically adjusting the amount of current carried by one or more of the phases.

8. The method according to claim 7, wherein dynamically adjusting the amount of current carried by each phase comprises deactivating one or more of the phases and redistributing the current to each remaining active phase responsive to a decrease in the load current.

9. The method according to claim 7, wherein dynamically adjusting the amount of current carried by each phase comprises activating one or more previously deactivated ones of the phases and redistributing the current to each active phase responsive to an increase in the load current.

10. The method according to claim 1, further comprising allocating the load current unequally between the phases.

11. The method according to claim 1, further comprising scaling the phase-specific target currents.

12. The method according to claim 1, further comprising increasing the current provided by the first phase to the load responsive to a dynamic transition in the output voltage before the phase-specific target current for the first phase reflects the dynamic transition in the output voltage.

13. The method according to claim 12, wherein increasing the current provided by the first phase to the load responsive to the dynamic transition in the output voltage comprises combining a pulse signal with the phase-specific target current and sensed inductor current for the first phase before the phase-specific target current for the first phase reflects the dynamic transition in the output voltage.

14. The method according to claim 12, wherein increasing the current provided by the first phase to the load responsive to the dynamic transition in the output voltage comprises combining a scaled derivative of the output voltage with the phase-specific target current and sensed inductor current for the first phase before the phase-specific target current for the first phase reflects the dynamic transition in the output voltage.

15. A multiphase switching regulator, comprising:
   a power stage including at least a first phase and a second phase for supplying power to a load through inductors coupling the phases to the load;
   current sensors operable to sense the current in the inductors coupling the phases to the load; and
   a controller operable to switch the first phase at a higher switching frequency than the second phase via pulse width modulation (PWM) signals provided to the phases, generate a phase-specific target current for each phase at the switching frequency for that phase based on the difference between an output voltage of the power stage and a reference voltage, generate a current error signal for each phase based on the difference between the phase-specific target current and sensed inductor current for that phase, filter each of the current error signals, and adjust a duty cycle of the PWM signal provided to each phase based on the filtered current error signal for that phase.

16. The multiphase switching regulator according to claim 15, wherein the controller comprises a plurality of compensators, each compensator operable to generate the phase-specific target current for one of the phases.

17. The multiphase switching regulator according to claim 15, wherein the controller is operable to limit a maximum current supplied to the load.

18. The multiphase switching regulator according to claim 15, wherein the controller is operable to filter each of the current error signals by removing high frequency components of the current error signals.

19. The multiphase switching regulator according to claim 15, wherein the controller is operable to scale the current error signals prior to the filtering.

20. The multiphase switching regulator according to claim 15, wherein the phase-specific target current is the peak current for a next cycle of the PWM signal or the average current for the next cycle.

21. The multiphase switching regulator according to claim 15, wherein the controller is operable to switch both the first and second phases to respond to a fast dynamic condition.

22. The multiphase switching regulator according to claim 15, wherein the controller is operable to dynamically adjust the amount of current carried by one or more of the phases.

23. The multiphase switching regulator according to claim 22, wherein the controller is operable to deactivate one or more of the phases and redistribute the current to each remaining active phase responsive to a decrease in the load current.

24. The multiphase switching regulator according to claim 22, wherein the controller is operable to activate one or more previously deactivated ones of the phases and redistribute the current to each active phase responsive to an increase in the load current.

25. The multiphase switching regulator according to claim 15, wherein the controller is operable to allocate the load current unequally between the phases.

26. The multiphase switching regulator according to claim 15, wherein the controller is operable to scale the phase-specific target currents.

27. The multiphase switching regulator according to claim 15, wherein the controller is operable to increase the current provided by the first phase to the load responsive to a dynamic transition in the output voltage before the phase-specific target current for the first phase reflects the dynamic transition in the output voltage.

28. The multiphase switching regulator according to claim 27, wherein the controller is operable to combine a pulse signal with the phase-specific target current and sensed inductor current for the first phase before the phase-specific target current for the first phase reflects the dynamic transition in the output voltage.

29. The multiphase switching regulator according to claim 27, wherein the controller is operable to combine a scaled derivative of the output voltage with the phase-specific target current and sensed inductor current for the first phase before the phase-specific target current for the first phase reflects the dynamic transition in the output voltage.

30. The multiphase switching regulator according to claim 15, wherein the controller comprises a nonlinear proportional-integral-derivative (PID) controller including a first integral unit associated with the first and second phases and which is active for steady state load conditions, a second integral unit associated with the first and second phases and which is active for fast dynamic conditions, a first proportional unit associated with the first phase, a second proportional unit associated with the second phase, a first derivative unit associated with the first phase, and second derivative unit associated with the second phase, and wherein the nonlinear PID controller is operable to generate the phase-specific target current for each phase based on the difference between the output voltage and the reference voltage, the difference input as an error signal to the first and second integral units, the first and second proportional units and the first and second derivative units.

31. The multiphase switching regulator according to claim 30, wherein the nonlinear PID controller further includes one or more filters operable to filter the error signal so that the error signal is non-zero only during fast dynamic conditions when input to the second integral unit and the first derivative unit.

* * * * *